United States Patent
Gassmann et al.

(10) Patent No.: US 9,865,169 B2
(45) Date of Patent: Jan. 9, 2018

(54) VIEWING SYSTEM AND METHOD FOR DISPLAYING AN ENVIRONMENT OF A VEHICLE

(71) Applicant: Harman Becker Automotive Systems GmbH, Karlsbad (DE)

(72) Inventors: Bernd Gassmann, Straubenhardt-Langenalb (DE); Kay-Ulrich Scholl, Karlsbad (DE); Johannes Quast, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 178 days.

(21) Appl. No.: 13/754,379

(22) Filed: Jan. 30, 2013

(65) Prior Publication Data
US 2013/0194256 A1   Aug. 1, 2013

(30) Foreign Application Priority Data
Jan. 30, 2012   (EP) .................................... 12000590

(51) Int. Cl.
G06G 1/16      (2006.01)
G06T 15/20     (2011.01)
G08G 1/16      (2006.01)

(52) U.S. Cl.
CPC ............ *G08G 1/163* (2013.01); *G06T 15/20* (2013.01); *G06T 2210/32* (2013.01)

(58) Field of Classification Search
None
See application file for complete search history.

(56) References Cited

U.S. PATENT DOCUMENTS 6,222,557 B1 *  4/2001  Pulley et al. ................. 345/622
6,483,429 B1    11/2002  Yasui et al.
(Continued)

FOREIGN PATENT DOCUMENTS

CN   101425181       5/2009
EP       1170173 A2 *  1/2002  ............... B60Q 1/48
(Continued)

OTHER PUBLICATIONS

CN Office Action dated May 29, 2015.
(Continued)

*Primary Examiner* — Kee M Tung
*Assistant Examiner* — Xin Sheng
(74) *Attorney, Agent, or Firm* — McCoy Russell LLP

(57) ABSTRACT

Displaying an environment of a vehicle comprising recording an image of an adjacent exterior environment of the vehicle in the form of image data with the aid of a plurality of image capture units and displaying an output image with the aid of a display device. A virtual, three-dimensional space and a surface are determined with the aid of an arithmetic unit the virtual, three-dimensional space being at least partially delimited by the surface. A projection of the image data onto the surface is calculated with the aid of the arithmetic unit. A virtual vehicle object from predetermined data is calculated as a computer-generated graphic in the virtual, three-dimensional space with the aid of the arithmetic unit. The output image is generated with the aid of the arithmetic unit by rendering a viewing volume which includes the virtual vehicle object, the viewing volume being delimited by the surface, and the viewing volume being based on a viewing position and a viewing angle and a zoom factor in the virtual, three-dimensional space.

15 Claims, 5 Drawing Sheets

(56) References Cited

U.S. PATENT DOCUMENTS

| | | | |
|---|---|---|---|
| 2002/0018047 A1 | 2/2002 | Okada et al. | |
| 2006/0250297 A1 | 11/2006 | Prakah-Asante et al. | |
| 2009/0268947 A1 | 10/2009 | Schaufler | |
| 2010/0268457 A1* | 10/2010 | McCrae et al. | 701/207 |
| 2010/0277468 A1 | 11/2010 | Lefevre et al. | |
| 2011/0032357 A1* | 2/2011 | Kitaura | B60R 1/00 348/148 |
| 2011/0175752 A1* | 7/2011 | Augst | B60R 1/00 340/905 |
| 2012/0069153 A1* | 3/2012 | Mochizuki | B60R 1/00 348/47 |
| 2012/0120239 A1* | 5/2012 | Hutzel | B60Q 3/023 348/143 |

FOREIGN PATENT DOCUMENTS

| | | | |
|---|---|---|---|
| EP | 1720131 | 11/2006 | |
| EP | 2133237 | 12/2009 | |
| EP | 2133237 A1 * | 12/2009 | B60R 1/00 |
| EP | 1462762 | 11/2010 | |

OTHER PUBLICATIONS

Bock, T., "Bewertung Von Fahrerassistenzsystemen mittels der Vehicle in the Loop-Simulation," Handbuch Fahrerassistenzsysteme, pp. 76-83, Wiesbaden, Germany, Sep. 1, 2009, 8 pages. (See NPL 2, European Office Action Issued in Application No. 12000590.5 for Explanation of Relevance).

European Patent Office, Office Action Issued in Application No. 12000590.5, Jul. 10, 2017, Germany, 6 pages.

\* cited by examiner

VIEWING SYSTEM AND METHOD FOR DISPLAYING AN ENVIRONMENT OF A VEHICLE

1. CLAIM OF PRIORITY

This patent application claims priority from EP Application No. 12 000 590.5 filed Jan. 30, 2012, which is hereby incorporated by reference.

2. FIELD OF TECHNOLOGY

The present invention relates to a viewing system and a method for displaying an environment of a vehicle for enhanced situational awareness.

3. RELATED ART

A graphics pipeline is known from the Wikipedia article: "Rendering" at http://en.wikipedia.org/wiki/Rendering. In a scene having a virtual observer, a viewing volume is delimited by the two clipping planes. All primitives in the scene are transformed in such a way that the virtual viewer is looking along the z depth axis. If the scene contains light sources, a color is calculated for each vertex on the basis of the material properties of the corresponding triangle. The visible volume of the scene from the viewer's perspective is a truncated pyramid (frustum). This frustum is transformed into a cube in the next step. Primitives that lie partially or entirely outside the viewing volume are clipped or removed with the aid of clipping and culling techniques. Finally, a transformation is applied that moves the vertex coordinates to the desired drawing area of the screen. The z coordinates remain the same, since they are needed for the later hidden surface determination. In the rastering step, all remaining primitives are rastered by coloring the pixels that belong to them. Since only the visible parts of overlapping triangles are to be displayed, a z buffer is used which carries out the hidden surface determination.

EP 1 720 131 B1 shows an augmented reality system with real marker object identification. The augmented reality system is configured to survey a real world environment, generate image data thereof, render virtual image data and superimpose the virtual image data with additional object data so as to augment the real word environment. Real image data received from the real environment may be processed and manipulated and may thereby be supplemented by object image data from a "virtual" object so as to provide an image to the user including the virtual object.

There is a need for an improved vehicle viewing system.

SUMMARY OF THE INVENTION

According to one aspect, a viewing system of a vehicle includes a plurality of image capture units for recording an image of an environment of the vehicle in the form of image data. The viewing system has a display device for displaying an output image. The viewing system has an arithmetic unit that is connected to the plurality of image capture units and the display device.

The arithmetic unit is configured to determine a virtual, three-dimensional space and a surface, the surface at least partially delimiting the virtual, three-dimensional space.

The arithmetic unit is configured to calculate a projection of the image data onto the surface.

The arithmetic unit is configured to calculate a virtual vehicle object as a computer-generated graphic from predefined data in the virtual, three-dimensional space.

The arithmetic unit is configured to generate the output image by rendering a viewing volume which includes the virtual vehicle object. The viewing volume is delimited by the surface. The viewing volume is based on a viewing position and a viewing angle and a zoom factor in the virtual, three-dimensional space.

According to another aspect, a system provides the user with a surround view, which may be output on a display. A viewing position and a viewing angle may be freely selected and changed as needed, so that the user is provided with an optimum view of the environment. The user can also easily capture the environment in relation to the vehicle position by displaying the vehicle object and thereby anticipate possible collisions.

Another object is furthermore to provide a method which has been improved as much as possible for displaying an environment of a vehicle.

In the method, an image of an environment of the vehicle is recorded in the form of image data with the aid of a plurality of image capture units.

In the method, an output image is displayed with the aid of a display device.

In the method, a virtual, three-dimensional space and a surface are determined with the aid of an arithmetic unit. The virtual, three-dimensional space is at least partially delimited by the surface.

In the method, a projection of the image data onto the surface is calculated with the aid of the arithmetic unit.

In the method, a virtual vehicle object is calculated as a computer-generated graphic from predefined data in the virtual, three-dimensional space with the aid of the arithmetic unit.

In the method, the output image is generated with the aid of the arithmetic unit by rendering a viewing volume which includes the virtual vehicle object. The viewing volume is delimited by the surface. The viewing volume is delimited by the surface, for example, in depth. The viewing volume is based on a viewing position and a viewing angle and a zoom factor in the virtual, three-dimensional space.

In one embodiment, the surface adjoins the virtual vehicle object, in particular multiple sides of the vehicle object. The vehicle object advantageously has an area that adjoins the surface.

The arithmetic unit may be configured to determine the surface using a shape, the shape having at least partially a concave curvature viewed from the side of the viewing position.

The arithmetic unit may be configured to determine the surface in a predominantly horizontal manner in an area which is adjacent to the vehicle object and extends to a curved region. The region of the surface adjacent to the vehicle object is preferably on the same plane as an base area of the vehicle object.

According to one embodiment, the arithmetic unit is configured to determine the surface in the shape of a bowl that has a base and a wall. The base of the bowl shape is designed to be predominantly horizontal, preferably planar. The wall of the bowl shape is designed to be curved.

According to an embodiment, the arithmetic unit is configured to determine the virtual, three-dimensional space in three spatial directions, the virtual, three-dimensional space being delimited by the surface in at least two of the spatial directions. This achieves a surround view, which enables the user to view the environment all around the vehicle, completely or in sections, e.g., from a bird's eye perspective. The virtual, three-dimensional space is preferably completely delimited in two of the spatial directions and at least partially delimited in the other, third, spatial direction.

According to an embodiment, the arithmetic unit is configured to determine the vehicle object in a fixed position within the virtual, three-dimensional space. The vehicle object is preferably animated, for example, in that virtual wheels of the vehicle object are rotated and/or swiveled during an ascertained movement of the vehicle.

According to an embodiment, the arithmetic unit is configured to calculate a distortion by projecting the image data onto the surface. Image data regions may be compressed thereby in order to output as large a portion of the environment as possible in the output image and to make it easier for the driver to orient himself.

According to an embodiment, the image capture units are designed, for example, as CMOS cameras or CCD cameras or the like. The image capture units preferably have a large fisheye (wide angle). According to an embodiment, the display device is designed as a touch screen or projector or the like.

The arithmetic unit may be configured to control the viewing volume.

To control the viewing volume, the arithmetic unit is preferably configured to change the viewing position between a first coordinate in the virtual, three-dimensional space and a second coordinate in the virtual, three-dimensional space.

To control the viewing volume, the arithmetic unit is preferably configured to change the viewing angle between a first direction in the virtual, three-dimensional space and a second direction in the virtual, three-dimensional space.

To control the viewing volume, the arithmetic unit is preferably configured to change the zoom factor between a first zoom value and a second zoom value.

The arithmetic unit is preferably configured to change the viewing position and/or the viewing angle and/or the zoom factor on the basis of an ascertained input by the user. The arithmetic unit is preferably configured, in particular, to automatically change the viewing position and/or the viewing angle and/or the zoom factor. A user input is not necessary for this purpose.

According to an embodiment, the arithmetic unit is configured to continuously change the viewing position along a trajectory. A trajectory of this type has, for example, a circular shape or an elliptical shape.

According to a particularly advantageous embodiment, the arithmetic unit is configured to determine a collision probability. The collision probability of a collision between a region of the vehicle and an object in the environment is determined on the basis of at least one ascertained distance to the object in the vehicle's environment. For example, the distance between the region of the vehicle and the object is measured and compared with a plurality of threshold values. For example, the collision probability has a value in a value range from 0 (no collision) to 1 (collision is imminent).

According to an embodiment, the arithmetic unit is configured to also determine the collision probability of the collision between the region of the vehicle and the object in the environment on the basis of at least one signal associated with a movement of the vehicle in the environment. The signal is preferably a control signal or a sensor signal. The signal is preferably associated with a gear selection, in particular forward and backward, and/or a speed of the vehicle and/or an acceleration of the vehicle and/or a change in position ascertained with the aid of a satellite signal and/or a sensed brake pedal position and/or a sensed accelerator pedal position and/or a set turn indicator.

According to an embodiment, each region of the vehicle is associated with at least one predetermined viewing volume. The predetermined viewing volume has a part of the vehicle object associated with the region and a surface region of the surface adjoining the associated part. The arithmetic unit is configured to control the predetermined viewing volume associated with the region of the vehicle when the threshold is exceeded by the collision probability. The part of the vehicle object associated with the region of the vehicle and the surface region of the surface adjoining the associated part are thus rendered to generate the output image.

This embodiment achieves the advantage that an output image is generated dynamically which displays a space between the region of the vehicle and the object in the environment if there is a risk of collision. The user may therefore more accurately estimate the possibility of a collision.

To ascertain an exceeding of the threshold by the collision probability, the collision probability is preferably compared with a plurality of, in particular, fixed threshold values. The viewing position associated with the exceeding of the threshold is ascertained on the basis of a table (LUT—lookup table). The collision probability is, for example, a value or a vector. For example, the vector has an associated collision probability value for each region of the vehicle.

According to an embodiment, the arithmetic unit has an interface that detects a plurality of movement values of the signal which are associated with a movement of the vehicle. For example, the interface has a bus connection for connection to sensor nodes of a data bus and/or an analog/digital converter for evaluating analog sensor signals.

The embodiments described above are particularly advantageous individually as well as in combination. All embodiments may be combined with each other. Some possible combinations are explained in the description of the exemplary embodiments in the figures. However, these possibilities illustrated therein for combining the features of the possible embodiments are not final.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

The invention is explained in greater detail below on the basis of exemplary embodiments illustrated in the drawings, where.

DETAILED DESCRIPTION OF THE INVENTION

Figure 1:
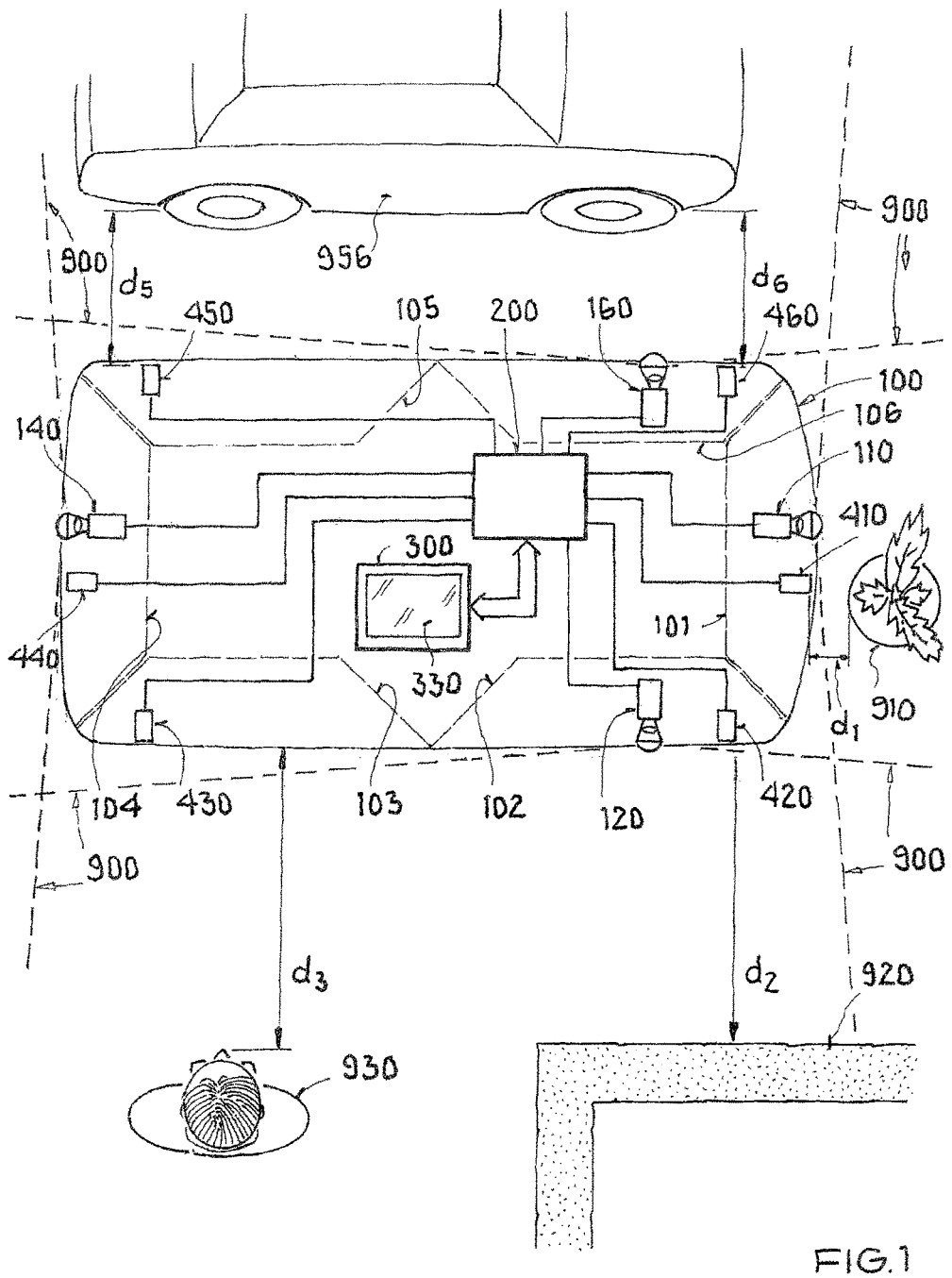
FIG. 1 shows a schematic representation of a vehicle in an environment.

FIG. 1 shows a schematic view of a motor vehicle 100 in an environment 900. The exemplary environment 900 includes a flower tub 910, a wall 920, a person 930 and another vehicle 956 as objects. The vehicle 100 is illustrated only as an outline. The vehicle 100 has regions 101, 102, 103, 104, 105, 106, which may collide with objects 910, 920, 930, 956 in the environment 900. In addition, a plurality of cameras 110, 120, 140, 160 as image capture units and a plurality of distance sensors 410, 420, 430, 440, 450, 460 are illustrated schematically.

The cameras 110, 120, 140, 160 are directed toward the outside in the vehicle 100, so that the cameras 110, 120, 140, 160 record an image of the environment 900. In the embodiment illustrated in FIG. 1, however, the vehicle 100 is not recorded by the cameras 110, 120, 140, 160 itself. To record the image of environment 900 all around the vehicle 100 using a relatively small number of cameras, the cameras 110, 120, 140, 160 have a very wide viewing angle of, for example, 175° (fisheye), which is indicated in FIG. 1 by the broken lines. The cameras 110, 120, 140, 160 are therefore situated for a surround view. The recording regions of two cameras 110 and 120, for instance, may overlap.

Each of the distance sensors 410, 420, 430, 440, 450, 460 is designed to record distance. The distance sensor 410, 420, 430, 450, 460 measures a distance $d_1$, $d_2$, $d_3$, $d_5$, $d_6$, respectively between the vehicle 100 and one of objects 910, 920, 930, 956 in a contactless manner, for example capacitively or using ultrasound. The distance sensor 440 also measures a distance $d_4$, which is not shown in the embodiment of FIG. 1 since there are no objects close to this viewing area.

The cameras 110, 120, 140, 160 and the distance sensors 410, 420, 430, 440, 450, 460 are connected to a signal and/or data processor 200, which is configured to evaluate the signals of the cameras 110, 120, 140, 160 and the distance sensors 410, 420, 430, 440, 450, 460. In the exemplary embodiment in FIG. 1, the arithmetic unit 200 is also connected to a touch screen 300, which is configured to output an output image 330 and to input control commands by the user.

The system illustrated in FIG. 1 displays environment 900 recorded by the cameras 110, 120, 140, 160 to the user in the output image 330. The output image 330 is not static, but is instead advantageously controlled based on a plurality of (variable) distances $d_1$, $d_2$, $d_3$, $d_4$, $d_5$, $d_6$.

Figure 2:
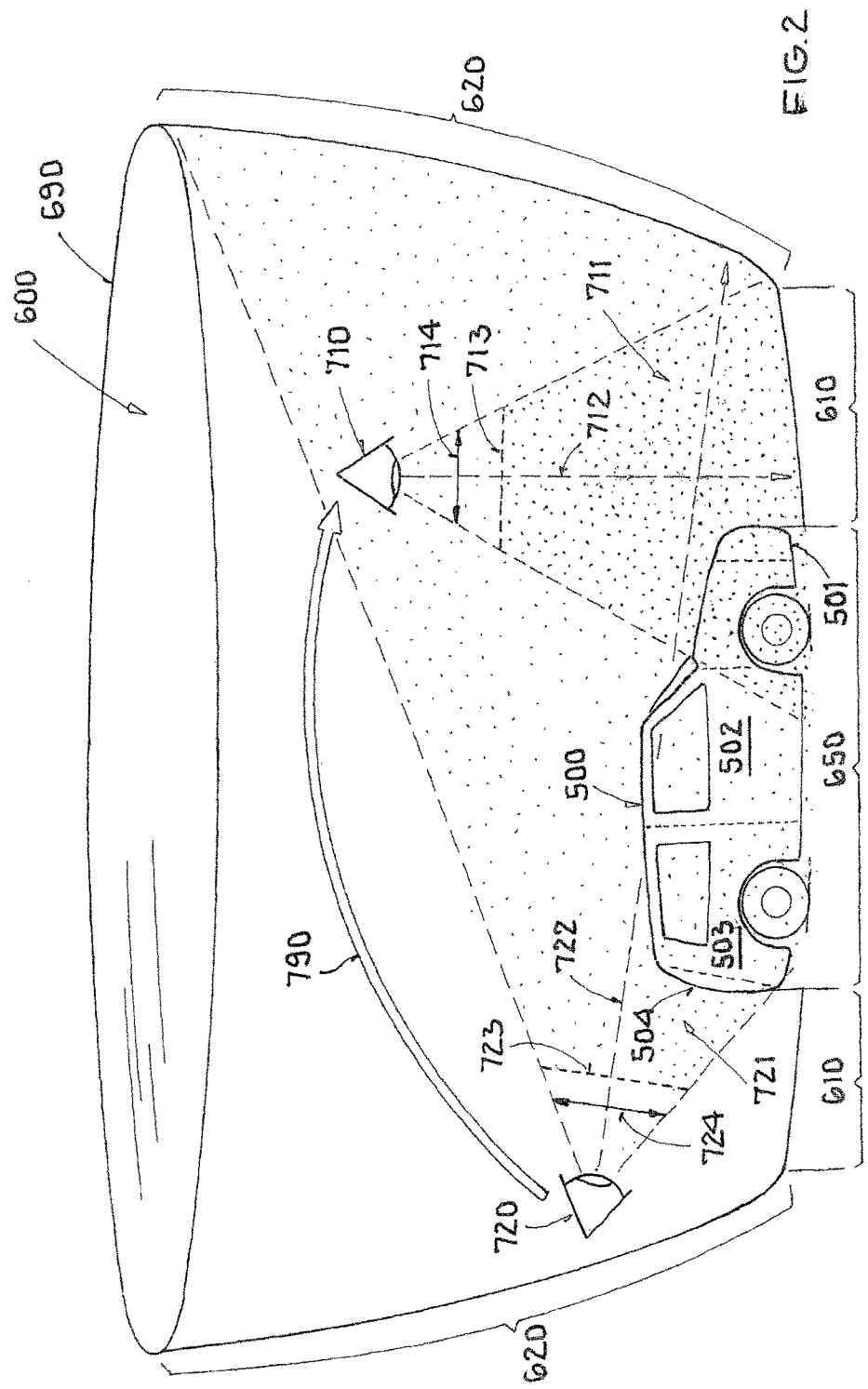
FIG. 2 shows a schematic representation of a three-dimensional space, including a computer-generated vehicle object.

The generation of the output image 330 is illustrated schematically in FIG. 2. Since the cameras 110, 120, 140, 160 of the vehicle 100 are directed to the outside, the vehicle 100 itself is not recorded by the cameras 110, 120, 140, 160. Instead of the real vehicle 100, a vehicle object 500 is calculated from predefined data as a computer-generated graphic. The computer-generated graphic shows, for example, the same type of vehicle, the color of the vehicle object 500 being adaptable to the vehicle 100, for example. The vehicle object 500 has a plurality of parts 501, 502, 503, 504, each of the parts 501, 502, 503, 504 of the vehicle object 500 are associated with a region 101, 102, 103, 104 of the actual vehicle 100.

The vehicle object 500 is positioned in a virtual, three-dimensional space 600. The virtual, three-dimensional space 600 is delimited by a surface 690. In the exemplary embodiment in FIG. 2, the surface 690 is in the shape of a bowl. A base 610 of the surface 690 is predominantly horizontal. On the other hand, a wall 620 of the surface 690 is predominantly vertical and has a concave curvature in the direction of the vehicle object 500.

A projection of image data onto surface 690 is calculated, the image data being recorded with the aid of the cameras 110, 120, 140, 160. The recorded image data is projected onto the inside of the bowl in FIG. 2. Due to the shape of the surface 690, a distortion of the image data is achieved for the output image 330. The distortion makes it possible to display a projection region on the predominantly horizontal sections 610 of the surface 690 in an enlarged manner in the output image 330, compared to the concave sections 620. The surface 690 has a hole 650 below the vehicle object 500, since the cameras 110, 120, 140, 160 are directed towards the outside and do not capture the real vehicle 100 itself. Alternatively to the bowl shape according to FIG. 2, another shape, for example, a hemisphere, may also be provided. However, the bowl shape has the advantage of distorting the image data. It is also possible to adapt the shape of the surface 690 as a function of a measured variable and/or a control variable. The measured variable being the vehicle speed for example. The control variable being a user input. The shape is adapted, for example by varying the width of predominantly horizontal region 610.

The output image 330 is generated based on a viewing volume 711, 712. The viewing volume 711, 721 is delimited in the three-dimensional space 600 by the surface 690. The viewing volume 711, 721 is based on a viewing position 710, 720 and a viewing angle 712, 722 and a zoom factor 714, 724 in the virtual, three-dimensional space 600. The viewing position 710, 720 must be assigned to a region enclosed by the surface 690. The zoom factor 714, 724 may be fixed or adjustable. In the embodiment in FIG. 2, two viewing volumes 711, 721 are illustrated schematically by broken lines.

The first viewing volume 721 is defined by a so-called first clipping plane 723, by first zoom factor 724, by first viewing angle 722 and by the delimitation by surface 690. Based on the curvature of the surface 690 the first viewing volume 721 deviates from a truncated pyramid shape. The first zoom factor 724 is displayed in simplified form by an opening angle. The vehicle object 500 is also included in the first viewing volume 721, so that a region of the surface 690 is not visible "behind" the vehicle object 500 in the output image 330, seen from the first viewing position. A hidden surface determination is therefore carried out. Only parts of the vehicle object 500 are visible, parts 503 and 502 in the case of the first viewing position 720. The output image 330 is generated by rendering the first viewing volume 721.

The embodiment in FIG. 2 also shows the second viewing volume 711, which has a second viewing position 710 and a second viewing angle 712 and a second clipping plane 713 and a second zoom factor 714. The second viewing volume 711 has a front most part 501 of vehicle object 500 and predominantly horizontal region 610 of the surface 690. Due to the curvature of the surface 690 illustrated in FIG. 2, the second viewing volume 711 also has the shape of an inexact truncated pyramid, i.e., it is not an exact frustum. While the first viewing volume 721 provides a good overview of the environment 900 as an output image 330 in the direction of travel, the second viewing volume 711 provides a detailed view of the environment 900 directly in front of the vehicle object 500. In both cases, the vehicle object 500 makes it easier for the user to orient himself within the output image 330. In addition, other information, for example distance $d_1$ in meters or warning symbols, may be displayed in the output image 330 (not shown in FIG. 2).

Although it is possible to switch between the first viewing volume 721 and the second viewing volume 711 in the simplest case, a smooth variation from the first viewing volume to the second viewing volume improves orientation. The viewing position is advantageously changed continuously from the first viewing position 720 to the second viewing position 710 along a trajectory 790. A change in the viewing angle 722, 712 may also be adapted. Exemplary embodiments of such changes are explained by way of example in FIGS. 3a-3c.

An embodiment for trajectories 791, 792, 793, 797, 798 is illustrated in FIG. 3 for changing a viewing position 720, 730, 740 at an associated viewing angle 722, 732, 742. The viewing position 720, 730, 740 is changed within virtual, three-dimensional space 600, virtual, three-dimensional space 600 additionally having the surface 690 and the vehicle object 500, as described in relation to FIG. 2.

Figure 3A:
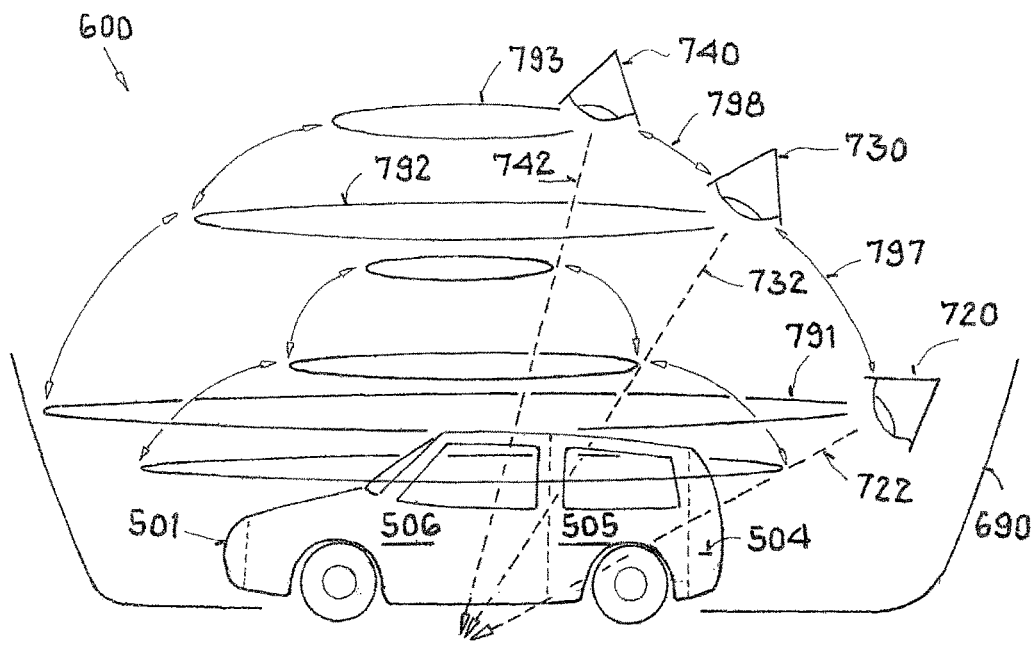
FIGS. 3a-3c show views of a viewing position and a viewing angle of the computer-generated vehicle object.

The vehicle object 500 in FIG. 3a, in turn, has a plurality of parts 501, 504, 505, 506, each part 501, 504, 505, 506 of the vehicle object 500 being associated with a region 101, 104, 105, 106 of the real vehicle 100. In the embodiment in FIG. 3a, the viewing position 720 is changed on a horizontal, elliptical trajectory 791, which simulates a movement of a viewer around the vehicle object 500. In the illustrated starting position, the part 504 of the vehicle object 500 and an region of the surface 690 adjacent thereto is visible to the viewer in the output image 330. On the other hand if viewing position 720 at the front of the vehicle object 500 has priority, the part 501 of the vehicle object 500 and a region of the surface 690 adjacent thereto are visible in output image 330.

In addition, a viewing position 740 from a bird's eye perspective, which has an associated trajectory 793, and a viewing position 730 between lowermost viewing position 720 and viewing position 740 from a bird's eye perspective, are each shown at different heights. The change in height of the viewing position 720, 730, 740 is also illustrated by a trajectory, for example a circular trajectory 797, 798. If a danger of collision is ascertained with the aid of the sensors 410, 420, 430, 440, 450, 460 according to FIG. 1, the viewing position 720, 730, 740 is changed along trajectories 791, 792, 793, 797, 798 in such a way that the possibility of collision between the part 501 of vehicle object 500 and a corresponding object 910, shown by the projected image data, is visible in output image 330.

Figure 3B:
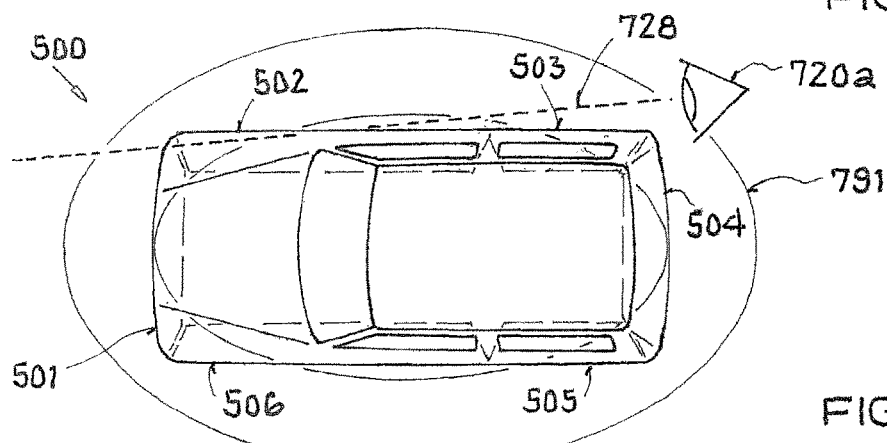
Figure 3C:
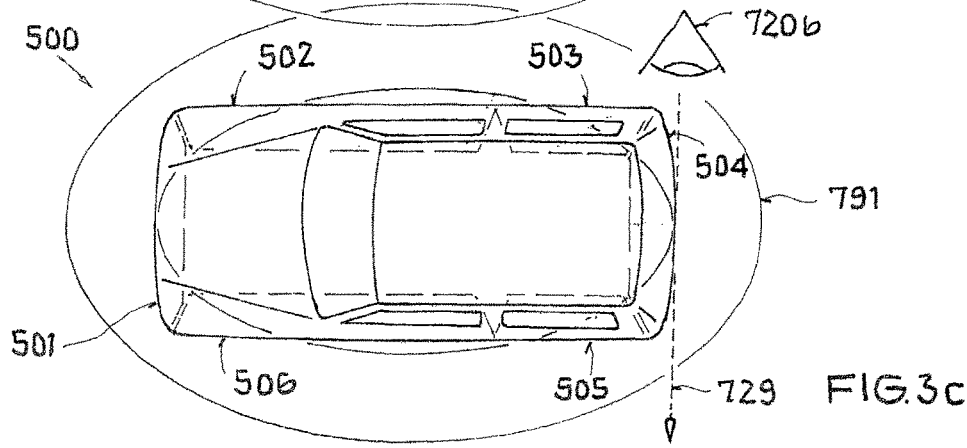

FIGS. 3b and 3c show another exemplary embodiment. The vehicle object 500 is shown from above. The viewing position 720a in FIGS. 3b and 720b in FIG. 3c is on elliptical trajectory 791. Only viewing angles 728 in FIGS. 3b and 729 in FIG. 3c are different. In the case of FIG. 3b, a collision probability is determined on the right side of the vehicle in one of regions 102, 103, so that the viewing angle 728 is directed toward right parts 502, 503 of the vehicle object 500. In the case of FIG. 3c, on the other hand, a collision probability is determined at the back of the vehicle in the region 104, so that viewing angle 729 is swiveled to the rear part 504 of the vehicle object 500. Viewing position 720a, 720b is retained.

Figure 4:
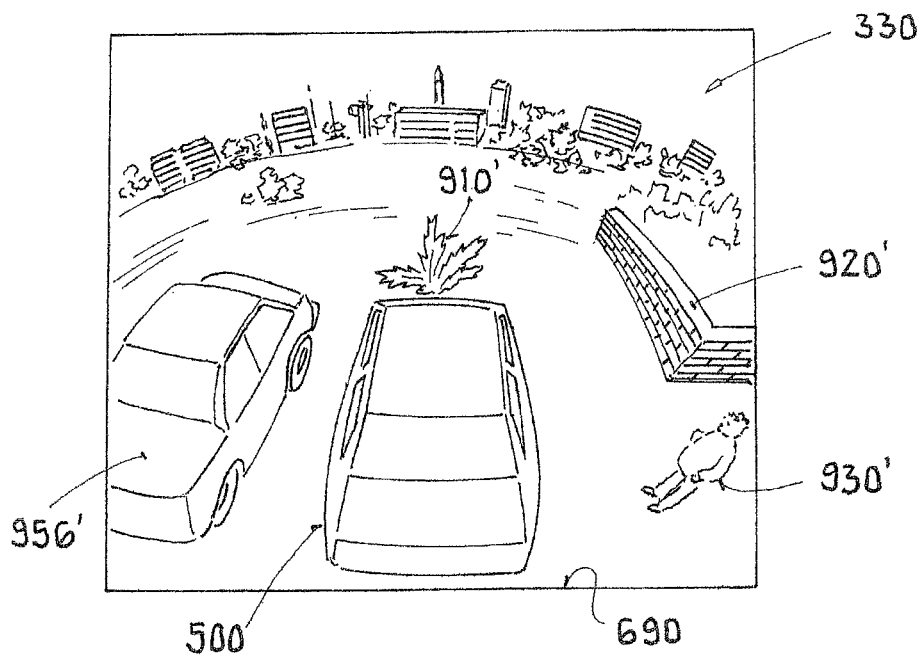
FIG. 4 shows a schematic representation of an output image from a bird's eye perspective.

An output image 330 is illustrated schematically in FIG. 4, the output image 330 in FIG. 4 having been generated with the aid of virtual, three-dimensional space 600 which includes surface 690. The view from the first viewing position 720 in FIG. 2, which was rendered from first viewing volume 721, is shown. Object images 910', 920', 930' and 956' generated from image data of the cameras 110, 120, 140, 160 and displayed in the output image 330 are distorted in the output image 330 due to the bowl-shaped surface 690.

Figure 5:
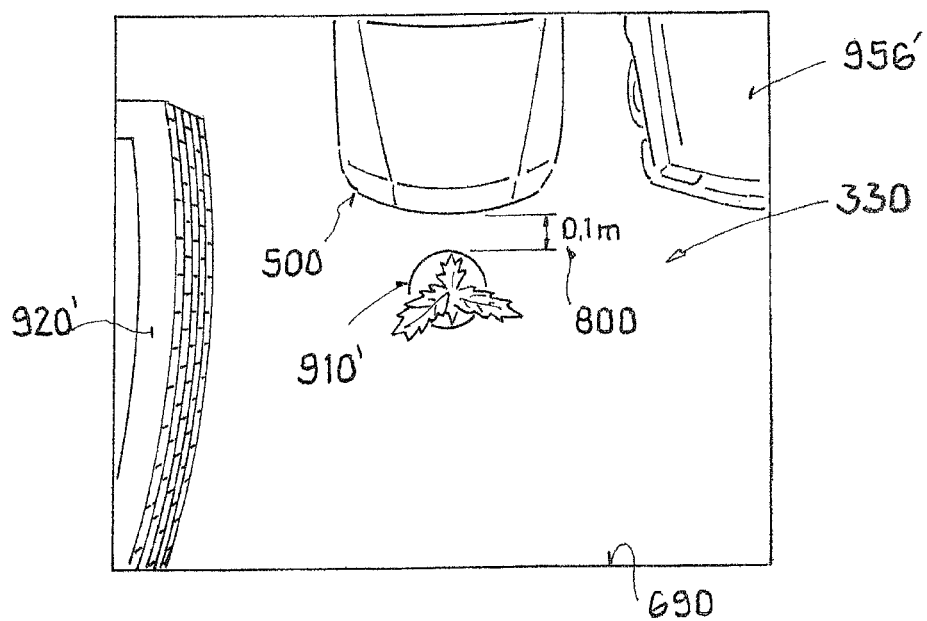
FIG. 5 shows a schematic representation of an output image for a collision region.

The output image 330 for the second viewing volume 711 from FIG. 2 is illustrated schematically in FIG. 5. The output image 330 clearly shows to the user the distance between the vehicle 100 and the object 910 by displaying a view from above of the vehicle object 500 in relation to projected image 910' of the object 910 in the output image 330. It is also possible to display a distance indication 800 in the output image 330.

Figure 6:
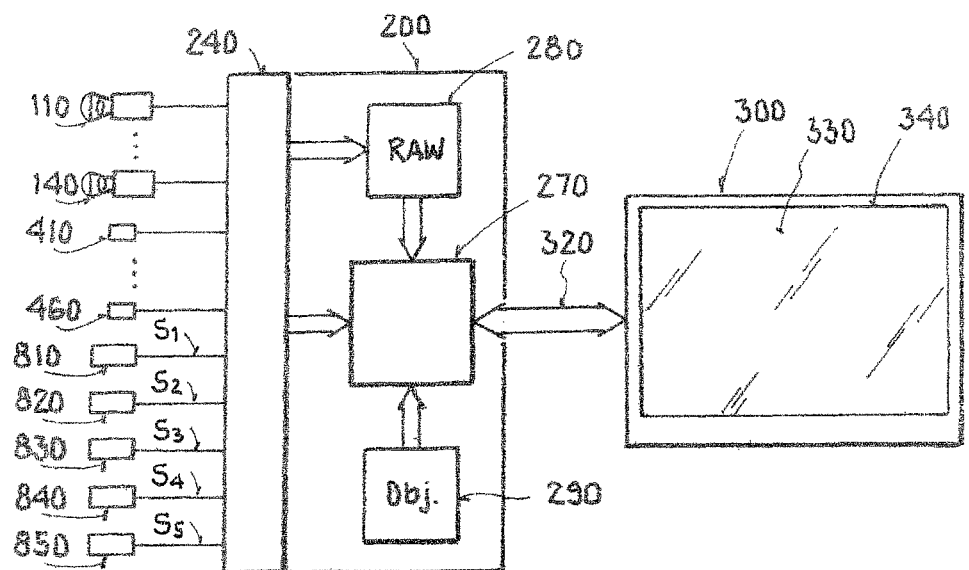
FIG. 6 shows a schematic block diagram of a viewing system.

FIG. 6 shows a system for a motor vehicle 100 as a schematic block diagram. The system has a plurality of cameras 110 through 140, a plurality of distance sensors 410 through 460 and status sensors 810, 820, 830, 840, 850. The cameras 110-140, the distance sensors 410-460 and the status sensors 810, 820, 830, 840, 850 are connected to an interface 240 of an arithmetic unit 200. The first status sensor 810 is configured, for example, to sense a gear selection and outputs associated first sensor signal $S_1$. The second status sensor 820 is configured, for example, to sense a steering wheel motion and outputs associated second sensor signal $S_2$. The third status sensor 830 is configured, for example, to sense an accelerator pedal position and outputs associated third sensor signal $S_3$. The fourth status sensor 840 is configured, for example, to sense a brake pressure and outputs associated fourth sensor signal $S_4$. The fifth status sensor 850 is configured, for example, as a switch to determine a turn indicator setting and outputs associated fifth sensor signal $S_5$. If the sensor signals $S_1$, $S_2$, $S_3$, $S_4$, $S_5$ are provided as analog signals, the interface 240 may have an analog/digital converter. Alternatively, the sensors 410-460, and/or 810-850 and/or cameras 110-140 may be connected to the interface 240 via a data bus.

In the embodiment in FIG. 6, the arithmetic unit 200 is connected to a display 300 via a data connection 320. The display 300 is, for example, a touch screen which enables commands to be input by the user over the connection 320. The display 300 has a display region 340 in which an output image 330 rendered by the arithmetic unit 200 is displayed. An image of the environment 900 of the vehicle 100 according to FIG. 1 is recorded by the cameras 110-140 and written as image data RAW to a buffer 280 of the arithmetic unit 200 via the interface 240. The arithmetic unit 200 has a memory area 290 in which predefined data Obj is stored. Logic 270 of the arithmetic unit 200 is configured to generate a computer-generated graphic from stored, predefined data Obj in the form of a virtual vehicle object 500 in a three-dimensional space 600. For example, the logic 270 has a graphics processor for this purpose. The logic 270 is furthermore configured to generate the output image 330 from the vehicle object 500 and image data RAW as a function of the distance sensors 410-460 and sensor signals $S_1$ through $S_5$ of status sensors 810-850. A viewing position and a viewing angle in the three-dimensional space are controlled as a function of the sensors 410-460, 810-850 in such a way that the output image 330 is automatically adapted to the environment 900 change of the vehicle 100, and a critical collision region is automatically displayed to the user.

Figure 7:
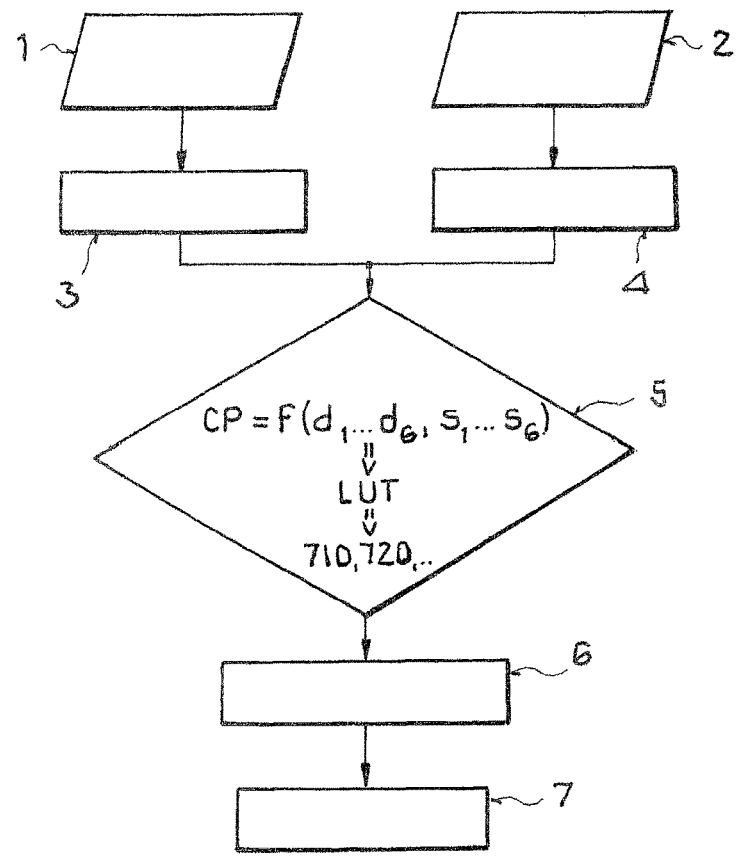
FIG. 7 shows a schematic flow chart.

FIG. 7 shows a schematic flow chart which includes method steps 1, 2, 3, 4, 5, 6, 7. In first method step 1, a status sensor system, for example including the sensors 810, 820, 830, 840, 850, and the sensor signals $S_1$, $S_2$, $S_3$, $S_4$, $S_5$ according to FIG. 6 are evaluated. The status sensor system captures an anticipated further course of movement of the vehicle 100 with the aid of the sensor signals $S_1$, $S_2$, $S_3$, $S_4$, $S_5$ or with the aid of information obtained from the sensor signals $S_1$, $S_2$, $S_3$, $S_4$, $S_5$. For example, the gear selection, in particular forward gear or reverse gear, and/or a steering wheel movement and/or an accelerator pedal position and/or a brake pressure and/or a turn signal setting are sensed. The evaluation of the status sensor system according to method step 1 preferably takes place continuously or at short time intervals of, for example, half a second.

An environment sensor system is evaluated in a second method step 2. For example, the environment sensor system according to FIG. 1 has the distance sensors 410, 420, 430, 440, 450, 460. It is also possible to obtain distance values from image data RAW using the cameras 110, 120, 130, 140 as sensors. The environment sensor system makes it possible to evaluate the environment with the aid of sensor data or with the aid of information obtained from sensor data. In particular, the objects 910, 920, 930, 956 in environment 900 may be detected and their distance $d_1$, $d_2$, $d_3$, $d_4$, $d_5$, $d_6$ and/or direction in relation to vehicle 100 determined, for example "right front", "right rear", "center rear", etc. A statement regarding a distance $d_1$ through $d_6$ between an object 910, 920, 930, 956 and the vehicle 100 may preferably be made using the environment sensor system. For example, an ultrasonic distance sensor may be used. Alternatively or in combination with the ultrasonic distance sensor, an object is detected from image data RAW, and/or a person 930 is detected with the aid of thermopiles.

In the third method step 3, data of the status sensor system is interpreted, and the direction (gear/steering wheel motion/turn signals) in which vehicle 100 is expected to move and at what speed (accelerator pedal/brake pressure) are ascertained. On the other hand, the environment sensor system is interpreted in the fourth method step 4; for example, an approach toward or moving away from an object 910, 920, 930, 956 and/or its direction of movement in the environment 900 may be determined.

A predetermined viewing volume 721, 711, which has a viewing position 710, 720 and/or a viewing angle 712, 722, is ascertained in the fifth method step 5. The goal is to generate the output image 330 by rendering the predetermined viewing volume 711, 721. The predetermined viewing volume 711, 721 has a virtual vehicle object 500. The predetermined viewing volume 711, 721 is also delimited by a surface 690 in the direction of viewing angle 712, 722. A projection of image data RAW of an environment of the vehicle onto the surface 690 is calculated. The predetermined viewing volume 711, 721 is based on the viewing position 710, 720 and the viewing angle 712, 722 and on a fixed or variable zoom factor 714, 724 in virtual, three-dimensional space 600, as illustrated, for example, in FIG. 2. At least one viewing volume is associated with each region 101, 102, 103, 104, 105, 106 from FIG. 1. For example, predetermined viewing volume 711 from FIG. 2 is associated with the region 101 from FIG. 1. The predetermined viewing volume 711 has a part 501 of the vehicle object 500 associated with the region 101 of the vehicle 100 and a surface region of the surface 690 adjacent to the associated part 501 of the vehicle object 500.

A decision about which viewing position 710, 720 to be approached is made in fifth method step 5. To make the decision, for example, a threshold comparison is carried out in the exemplary embodiment in FIG. 7. A collision probability $$CP = f(d_1 \ldots d_6, S_1 \ldots S_5) \quad (1)$$

is determined, for example, as a vector. For example, each element of the vector is associated with one probability of a collision of a specific vehicle region 101, 102, 103, 104, 105, 106, as illustrated schematically in FIG. 1. For example, collision probability CP is a function of the distances $d_1$, $d_2$, $d_3$, $d_4$, $d_5$, $d_6$ of the environment sensor system and of sensor signals $S_1$, $S_2$, $S_3$, $S_4$, $S_5$ of the status sensor system of the vehicle 100.

In the embodiment in FIG. 7, the predetermined viewing volume 711 associated with the region 101 of the vehicle 100 is controlled if collision probability CP exceeds a threshold in order to render part 501 of the vehicle object 500 associated with the region 101 and in order to render the surface region of the surface 690 adjacent to the associated part 501.

For example, the viewing position, e.g., 710 according to FIG. 2, is read out as the output variable from a lookup table LUT which has the vector of collision probability CP as an input variable. Alternatively, the viewing position 710 may also be ascertained from the status sensor system and the environment sensor system using another method, for example with the aid of fuzzy logic. For example, the sensor data or the information of the environment sensor system obtained from the sensor data may be rated, e.g., in the form of an urgency, using the elements "info" and "warning" and "critical." For example, each classification, e.g., "info" and "warning" and "critical," is assigned to a distance range, e.g., ">3 m" (Info) or "0.5 m to 3 m" (Warning), or "<0.5 m" (Critical), respectively.

The viewing positions, corresponding to 710, 720, etc. from FIG. 2, are divided into classes in the embodiment in FIG. 7. Class I identifies a number of viewing positions for the detailed view, e.g., "right front", "left front", "right rear", "left rear." Class II identifies a number of viewer positions for the overview, e.g., "front center", "rear center." Class III identifies a number of viewing positions from a bird's eye perspective, e.g., "front above", "rear above." Classes I, II, III may be stored, for example, in a look-up table LUT. The current class in each case is controlled on the basis of distances, for example with the aid of the distance sensors 410-460 and, if applicable, other signals of the environment sensor system and, if applicable, sensor signals of the status sensor system. Consequently, the current viewing position is determined as a function of the classification (urgency) and the location or change in location of the possibly colliding object and the direction of movement of the vehicle.

For example, if it is determined in fifth step 5 that the danger and thus the probability of a collision is high in both the rear region (corresponding to 104 from FIG. 1) and the front region (corresponding to 101 from FIG. 1), or if no danger of collision is ascertained, the viewing position is controlled from a birds' eye perspective, which predominantly shows the projected image data in the direction of travel. If a danger of collision in the direction of travel exists only on one side of the vehicle 100, a viewing volume which has a detailed view of the relevant part of vehicle object 500 is controlled. On the other hand, if a danger of collision in the direction of travel lies on both sides of the vehicle 100, a viewing volume which has a viewing position in the center is controlled, so that the viewing volume includes both side parts of vehicle object 500.

A change in the viewing volume is controlled in sixth step 6. The viewing position is changed between a first coordinate in the virtual, three-dimensional space and a second coordinate in the virtual, three-dimensional space. The viewing position is changed in a movement along a trajectory between the first coordinate and the second coordinate. For example, the trajectory has an elliptical shape, the vehicle object being positioned in the center of the ellipsis. The viewing position may also be changed between a first direction in the virtual, three-dimensional space and a second direction in the virtual, three-dimensional space. For example, a zoom factor may be permanently set.

A transition between two viewing volumes is regulated with the aid of a logic, so that the viewing position does not continuously swing back and forth. For example, a change to a viewing position for a viewing volume having a detailed view with the aid of the logic is permitted only starting from the corresponding viewing position in the center; otherwise, the viewing position in the center is controlled first, and the viewing position for the viewing volume having the detailed view is controlled only thereafter.

A change from the viewing position in the center to the viewing position for the viewing volume having the detailed view and/or a change from the viewing position in the center to the viewing position from a bird's eye perspective is controlled with the aid of the logic via a time delay. Although a temporary danger of collision is detected by the environment sensor system, it does not lead to a change in the viewing position, due to the delay, since the control of the change in the viewing position before the end of the delay has already been overwritten by a counter-control.

The change in viewing position is animated in seventh step 7. For example, the movement along the trajectory is first accelerated, starting from the first viewing position, and braked before reaching the second viewing position. This enables the viewer of the output image to orient himself in the change in perspective, so that the viewer is able to capture the new view and a possible danger of collision.

The invention is not limited to the embodiment variants illustrated in FIG. 1-7. For example, it is possible to use a different number of cameras, for example a single surround camera or a camera for displaying the environment above the vehicle. It is also possible to use other sensors of the environment sensor system and status sensor system, such as radar sensors or the like. The functionality of the block diagram according to FIG. 6 may be particularly advantageously used for an infotainment system of a motor vehicle.

Although the present invention has been illustrated and described with respect to several preferred embodiments thereof, various changes, omissions and additions to the form and detail thereof, may be made therein, without departing from the spirit and scope of the invention.

What is claimed is:

1. A viewing system of a vehicle, comprising:
   a plurality of cameras that each records an image of an exterior environment of the vehicle and provides captured image data indicative thereof;
   a display that displays an output image; and
   a processor that receives the captured image data, wherein the processor is configured to:
   determine a virtual, three-dimensional space and a surface that at least partially delimits the virtual, three-dimensional space;
   calculate a single projection of the captured image data directly onto the surface;
   calculate a virtual vehicle object as a computer-generated graphic from predetermined data in the virtual, three-dimensional space; and
   generate the output image by rendering a first viewing volume which includes the virtual vehicle object, the first viewing volume being delimited by the surface, the first viewing volume being based on a first viewing position and a first viewing angle and a first zoom factor in the virtual, three-dimensional space and by rendering a second viewing volume different from the first viewing volume which includes a frontmost part of the virtual vehicle object and a horizontal region of the surface in front of the virtual vehicle object, the second viewing volume being based on a second viewing position different from the first viewing position and a second viewing angle different from the first viewing angle and a second zoom factor different from the first zoom factor in the virtual, three-dimensional space,
   wherein the processor is configured to adapt a shape of the surface as a function of a measured variable.

2. The viewing system of claim 1, wherein, to transition between the first viewing volume and the second viewing volume, the processor is configured to at least one of:
   change the first viewing position from a first coordinate in the virtual, three-dimensional space to a second coordinate in the virtual, three-dimensional space;
   change the first viewing angle from a first direction in the virtual, three-dimensional space to a second direction in the virtual, three-dimensional space; and
   change the first zoom factor from a first zoom value to a second zoom value.

3. The viewing system of claim 2, wherein at least one predetermined viewing volume is associated with each region of the vehicle, the predetermined viewing volume having a part of the vehicle object associated with the region of the vehicle and a surface region of the surface adjacent to the associated part,
   wherein the processor is configured to control the predetermined viewing volume associated with the region based on an exceeding of a threshold by a collision probability (CP) in order to render the part of the vehicle object associated with the region and the surface region of the surface adjacent to the associated part.

4. The viewing system of claim 1, wherein the processor is configured to determine a collision probability (CP) of a collision between a region of the vehicle and an object in the environment based on at least one measured distance to the object in the environment.

5. The viewing system of claim 4, wherein the processor is configured to determine the collision probability (CP) of the collision between the region of the vehicle and the object in the environment based on at least one signal which is associated with a movement of the vehicle in the environment.

6. The viewing system of claim 5, wherein the at least one signal is associated with at least one of: a gear selection, a speed of the vehicle, an acceleration of the vehicle, a change in position, a sensed brake pedal position, a sensed accelerator pedal position, and a set turn indicator.

7. The viewing system of claim 5, wherein the at least one signal is associated with at least two of: a gear selection, a speed of the vehicle, an acceleration of the vehicle, a change in position, a sensed brake pedal position, a sensed accelerator pedal position, and a set turn indicator.

8. The viewing system of claim 5, wherein the at least one signal is associated with a gear selection, a speed of the vehicle, an acceleration of the vehicle, a change in position, a sensed brake pedal position, a sensed accelerator pedal position, and a set turn indicator.

9. The viewing system of claim 1, wherein the measured variable is a speed of the vehicle.

10. A method for displaying an environment of a vehicle, comprising:

recording an image of an environment adjacent to the vehicle in the form of captured image data with the aid of a plurality of cameras;

displaying an output image on a display device;

determining a virtual, three-dimensional space and a surface with the aid of a processor, the virtual, three-dimensional space being at least partially delimited by the surface;

calculating a single projection of the captured image data directly onto the surface with the aid of the processor;

calculating a virtual vehicle object from predetermined data as a computer-generated graphic in the virtual, three-dimensional space with the aid of the processor;

generating the output image with the aid of the processor by rendering a first viewing volume which includes the virtual vehicle object, the first viewing volume being delimited by the surface, and the first viewing volume being based on a first viewing position and a first viewing angle and a first zoom factor in the virtual, three-dimensional space and by rendering a second viewing volume which includes a frontmost part of the virtual vehicle object and a horizontal region of the surface in front of the virtual vehicle object, the second viewing volume being different from the first viewing volume and based on a second viewing position, different from the first viewing position, and a second viewing angle, different from the first viewing angle, and a second zoom factor, different from the first zoom factor, in the virtual, three-dimensional space; and adapting a shape of the surface as a function of a measured variable.

11. The method of claim 10, wherein the measured variable is a speed of the vehicle.

12. A viewing system of a vehicle, comprising:

a plurality of cameras that each records an image of an exterior environment of the vehicle and provides captured image data indicative thereof;

a display that displays an output image; and a processor that receives the captured image data, wherein the processor is configured to:

determine a virtual, three-dimensional space and a surface that at least partially delimits the virtual, three-dimensional space;

calculate a single projection of the captured image data directly onto the surface;

calculate a virtual vehicle object as a computer-generated graphic from predetermined data in the virtual, three-dimensional space; and generate the output image by rendering a first viewing volume which includes the virtual vehicle object, the first viewing volume being delimited by the surface, the first viewing volume being based on a first viewing position and a first viewing angle and a first zoom factor in the virtual, three-dimensional space and by rendering a second viewing volume which includes a frontmost part of the virtual vehicle object and a horizontal region of the surface in front of the virtual vehicle object, the second viewing volume being based on a second viewing position and a second viewing angle and a second zoom factor in the virtual, three-dimensional space, wherein the processor is further configured to adapt a shape of the surface as a function of a user input.

13. The viewing system of claim 12, wherein the surface is in the shape of a bowl that has a base and a wall, the base of the bowl shape being designed to be planar, the wall of the bowl shape being designed to be curved.

14. A method for displaying an environment of a vehicle, comprising:

recording an image of an environment adjacent to the vehicle in the form of captured image data with the aid of a plurality of cameras;

displaying an output image on a display device;

determining a virtual, three-dimensional space and a surface with the aid of a processor, the virtual, three-dimensional space being at least partially delimited by the surface;

calculating a single projection of the captured image data directly onto the surface with the aid of the processor;

calculating a virtual vehicle object from predetermined data as a computer-generated graphic in the virtual, three-dimensional space with the aid of the processor;

generating the output image with the aid of the processor by rendering a first viewing volume which includes the virtual vehicle object, the first viewing volume being delimited by the surface, and the first viewing volume being based on a first viewing position and a first viewing angle and a first zoom factor in the virtual, three-dimensional space and by rendering a second viewing volume which includes a frontmost part of the virtual vehicle object and a horizontal region of the surface in front of the virtual vehicle object, the second viewing volume being based on a second viewing position and a second viewing angle and a second zoom factor in the virtual, three-dimensional space; and adapting a shape of the surface as a function of a user input.

15. The method of claim 14, wherein the surface is in the shape of a bowl that has a base and a wall, the base of the bowl shape being designed to be planar, the wall of the bowl shape being designed to be curved.

* * * * *